2,678,055

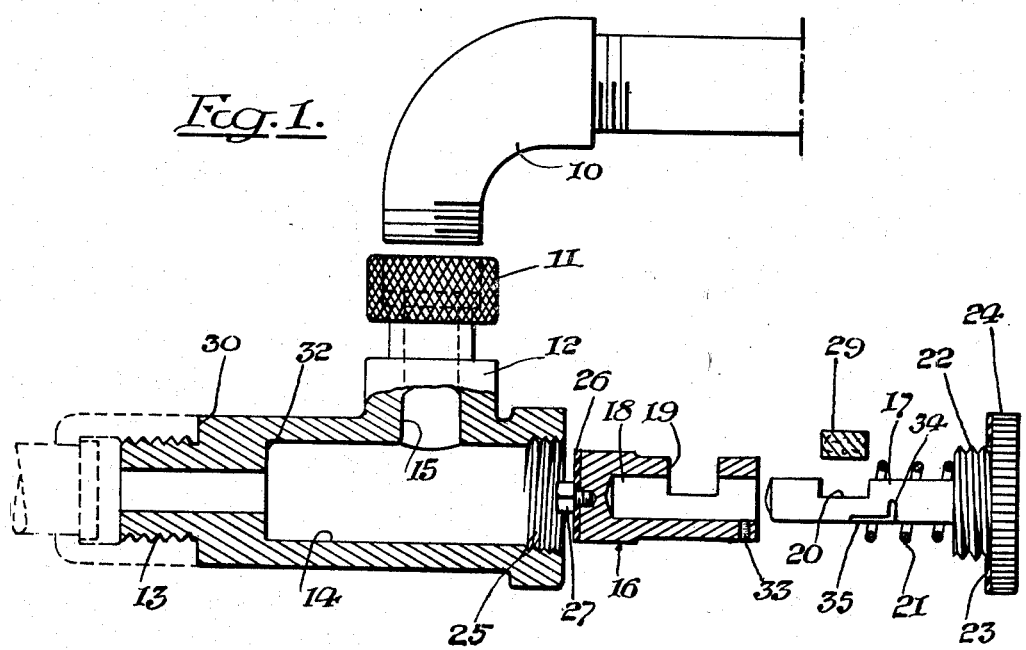
Fig. 1.
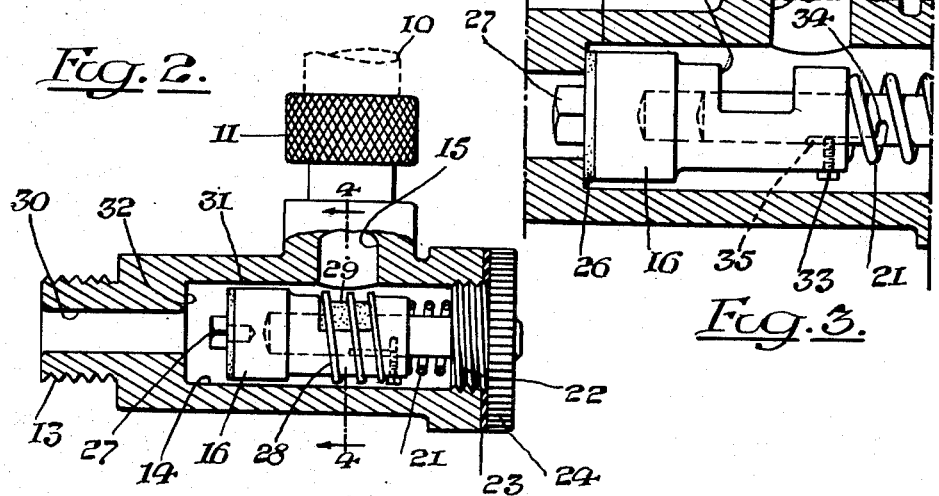
Fig. 2.
Fig. 3.
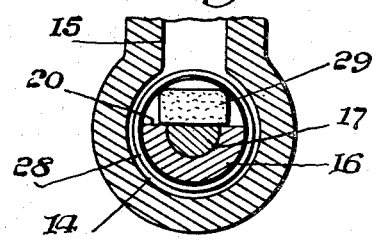
Fig. 4.
INVENTOR.
Carl J. Heim
BY Albert F. Krouman
ATTORNEY Patented May 11, 1954

UNITED STATES PATENT OFFICE 2,678,055

LIQUID METERING DEVICE

Carl J. Heim, Jamaica, N. Y.

Application November 12, 1952, Serial No. 319,846

6 Claims. (Cl. 137—67)

This invention relates to a device for metering the amount of liquid which flows through a line, also inter-mixing with said liquid certain other materials. Where it is desired to mix liquids, such as water or the like with other substances in a given proportion, or to measure the amount of liquid being dispensed through a line, it has heretofore been the practice to either mix the materials beforehand, and then dispense them, or to use expensive timing devices which govern the length of fluid flow.

Accordingly, it is an object of the present invention to provide a device which will govern the length of time that fluid flows through a line.

Another object of the present invention is to provide a device which will add certain desired materials, such as insecticides, fertilizers, fungicides, and the like to a stream of fluid.

A further object of the present invention is to provide an automatic valve shut-off of a simplified structure.

A feature of the present invention is the use of a soluble pill or pellet for controlnig the metering valve.

Another feature of the present invention is a valve structure occupying a minimum amount of space, and being capable of long continued use, without damage thereto.

The invention consists of the construction, combination and arrangement of parts, as herein illustrated, described and claimed.

In the accompanying drawings, forming a part hereof, is illustrated one form of embodiment of the invention, in which drawings similar reference characters designate corresponding parts, and in which:

Figure 1 is a vertical section, taken through a complete embodiment of the present invention, shown in a somewhat exploded form, with certain of the parts omitted for the sake of clarity.

Figure 2 is an assembled view of a complete embodiment of the present invention shown in Figure 1.

Figure 3 is a fragmentary view, somewhat enlarged, of the metering valve in the closed position.

Figure 4 is a section taken on line 4—4 in Figure 2, looking in the direction indicated by the arrows.

Referring to the drawings, 10 indicates a spigot or hose bib, such as may be found upon the end of a fluid line. A nut 11, rotatably carried upon a housing 12, is engageable with the threads on the ends of the spigot 10. When so engaged, the nut 11 forms a liquid tight coupling between the members 12 and the end of the spigot 10. The housing 12 comprises a substantially tubular member having threads 13 on the dispensing end thereof, and an enlarged internal bore 14. The bore 14 is in communication with the spigot 10 by means of a passage 15 which permits the fluid to enter the housing 12.

Slidably received within the bore 14 is a valve block 16, having a plunger 17 therein. The block 16 is provided with a bore 18 to accommodate the plunger 17. A notch 19 is cut into the valve block 16, so that there is provided an opening which communicates with the bore 18 of said block 16. The plunger 17 is also provided with a notch, as indicated at 20, in such manner that when the plunger is slipped through the valve block 16, the entire distance permitted by the bore 18, the notches 19 and 20 will be in register.

A small coil spring 21 is provided around the plunger 17, so that the insertion of the plunger within the valve block 16 must be made by compressing the coil spring 21. The plunger 17 is provided with a threaded boss 22 and a washer 23, which sits against a knurled knob 24. The knob 24 is employed for the purpose of inserting the plunger and valve assembly within the bore 14 of the housing 12.

Threads 25 are provided within the end of the housing 12, which threads 25 are engageable with the threads 22 on the plunger 17. The end of the valve block 16 is provided with a resilient washer 26 held thereto by a screw 27. The screw 27 also serves as a pilot on the end of the valve block 16.

Referring to Figure 2, it will be seen that a second coil spring 28 is disposed about the valve block 16. The function of the second coil spring 28 is to retain within the notches 19 and 20 a pill or pellet 29, formed from some suitably soluble material. The pellet 29 may be made in many forms, and of many substances, depending upon two considerations: the first being the time interval during which the valve is desired to be kept open, and the second being the requirement of adding to the fluid flowing through the valve some specific ingredients, such as an insecticide, fertilizer, fungicide, herbicide, or the like.

The dispensing end of the housing 12 is provided with a reduced bore 30, which communicates with the bore 14, and permits the fluid from the spigot 10 to leave the housing 12. When it is desired to use the metering and dispensing valve, the plunger 17 and the valve block 16 are removed from the housing 12, by means of unscrewing the threads 22. This disassembly may be achieved by rotating the knob 24. The plunger 17 is then forced into the block 16, against the resistance of the coil spring 21, until the two notches 19 and 20 are in register.

The coil spring 28 is pulled away from the notches 19 and 20, whereupon the pellet 29 may be placed therein. The size of the pellet required must be such that it will substantially fill the area between the two notches 19 and 20, and prevent the valve block 16 from sliding off the plunger 17. The spring 28 may then be released, whereupon it will expand and cover the pellet 29 to prevent its leaving the notches 19 and 20, until said pellet shall have become dissolved as a result of the flow of the desired amount of fluid through the housing 12.

The loaded valve block 16 and plunger 17 are then reinserted within the housing 12 and the knob 24 turned until a watertight coupling within the housing 12 of the members 16 and 17 is accomplished.

As will be seen from an examination of Figures 2 and 3, a suitable clearance 31 is provided between the outside of the block 16 and the inside diameter of the bore 14. Accordingly, when the fluid is fed into the bore 14, it is able to flow past the valve block 16 and out of the housing 12 by way of the bore 31.

As the fluid passes through the housing 12 it slowly dissolves the pellet 29. When the pellet no longer is able to hold the notches 19 and 20 in line by reason of said dissolution, the coil spring 21 will urge the valve block 16 in the direction of the bore 30. At this point the force of the fluid entering the bore 14 gets behind the valve block 16, and also forces it in the direction of the bore 30. The result of these forces is that the valve block 16 is pushed against the shoulder 32 formed at the end of the bore 14, by reason of the smaller bore 30 which communicates therewith. The resilient washer 26 thereupon closes the escape route of the fluid, so that said fluid is effectively cut off.

When it is desired to neutralize the above described apparatus, and to use the spigot in the customary manner, it is merely necessary to remove the plunger 17 and the valve block 16, as previously described, and force the said plunger within the block 16 until the notches 19 and 20 are in register. At this point a pin 33 will be in line with the locking slot 34 of the groove 35 in the plunger 17.

A slight rotation of the block 16 upon the plunger 17 will cause the pin 33 and locking slot 34 of the bayonet type lock to hold the valve block 16 away from the shoulder 32 until such time as it may be released by the user thereof.

It is within the purview of the present invention to provide pellets 29 having different degrees of solubility, and having different sizes. It is also possible to provide a plurality of pellets which may be inserted within the slots 19 and 20, each pellet representing a certain interval of time of fluid flow. Additionally, the pellets may be made of chemical materials in such manner that the user thereof can feel sure that a certain proportion of fluid is being mixed with the chemical content of the pellet throughout the dispensing cycle.

In this manner, for example, a gardener could apply highly concentrated fertilizer to vegetation, without danger of burning said vegetation, and with a minimum amount of effort. Additionally, fungicides, herbicides and insecticides could be sprayed through the ordinary hoze nozzle, in the prescribed strength. In addition, it will be seen that a highly effective timing device has been provided, whereby persons watering a lawn, for example, and desiring only a certain length of time for watering, can be sure that the period of watering will be terminated as desired, without the necessity of human intervention. Persons watering lawns, who might have forgotten to turn off the water supply, would not find the garden flooded, and a considerable amount of water wasted.

Having thus fully described the invention, what is claimed as new and desired to be secured by Letters Patent of the United States, is:

1. A liquid metering device comprising, a housing, fluid receiving and emitting openings in said housing, a chamber within the housing communicating with said openings, a valve block slidably carried within the chamber, a valve block receiving port in the housing wall, said block being adapted to be urged forward by fluid passing through the chamber to seal the fluid emitting opening, and having a bore therein, a plunger slidable within the valve block bore and a fluid soluble pellet engaged by the block and plunger within the chamber to prevent forward motion of the block during a specific interval of flow.

2. A liquid metering device comprising, a housing, fluid receiving and emitting openings in said housing, a chamber within the housing communicating with said openings, a valve block slidably carried within the chamber, a valve block receiving port in the housing wall, said block being adapted to be urged forward by fluid passing through the chamber to seal the fluid emitting opening, and having a bore therein, a first notch in the wall of the block communicating with the bore therein, a plunger slidable within the valve block bore, a second notch in the plunger and a fluid soluble pellet engaged by the block and plunger notches within the chamber to prevent forward motion of the block during a specific interval of flow.

3. A liquid metering device comprising, a housing, fluid receiving and emitting openings in said housing, a chamber within the housing communicating with said openings, a valve block slidably carried within the chamber, a threaded valve block receiving port in the housing wall, said block being adapted to be urged forward by fluid passing through the chamber to seal the fluid emitting opening, and having a bore therein, a first notch in the wall of the block communicating with the bore therein, a plunger slidable within the valve block bore, a threaded boss on the outer end of the plunger engageable with the threaded port, a second notch in the plunger and a fluid soluble pellet engaged by the block and plunger notches within the chamber to prevent forward motion of the block during a specific interval of flow.

4. A liquid metering device comprising, a housing, fluid receiving and emitting openings in said housing, a chamber within the housing communicating with said openings, a valve block slidably carried within the chamber, a threaded valve block receiving port in the housing wall, said block being adapted to be urged forward by fluid passing through the chamber to seal the fluid emitting opening, and having a bore therein, a plunger slidable within the valve block bore, a threaded boss on the outer end of the plunger engageable with the threaded port, a coil spring disposed about the plunger between the boss and block and a fluid soluble pellet engaged by the block and plunger within the chamber to prevent forward motion of the block during a specific interval of flow.

5. A liquid metering device comprising, a housing, fluid receiving and emitting openings in said housing, a chamber within the housing communicating with said openings, a valve block slidably carried within the chamber, a threaded valve block receiving port in the housing wall, said block being adapted to be urged forward by fluid passing through the chamber to seal the fluid emitting opening, and having a bore therein, a first notch in the wall of the block communicating with the bore therein, a plunger slidable within the valve block bore, a threaded boss on the outer end of the plunger engageable with the threaded port, a second notch in the plunger, a coil spring disposed about the plunger between the boss and block and a fluid soluble pellet engaged by the block and plunger notches within the chamber to prevent forward motion of the block during a specific interval of flow.

6. A liquid metering device comprising, a housing, fluid receiving and emitting openings in said housing, a chamber within the housing communicating with said openings, a valve block slidably carried within the chamber, a valve block receiving port in the housing wall, said block being adapted to be urged forward by fluid passing through the chamber to seal the fluid emitting opening, and having a bore therein, a first notch in the wall of the block communicating within the bore therein, a plunger slidable within the valve block bore, a second notch in the plunger and a fluid soluble pellet, a spring member overlying the valve block and pellet, said pellet being engaged by the block and plunger notches within the chamber to prevent forward motion of the block during a specific interval of flow.

References Cited in the file of this patent

UNITED STATES PATENTS

| Number | Name | Date |
|---|---|---|
| 1,956,858 | Densten | May 1, 1934 |
| 2,292,801 | Slidell | Aug. 11, 1942 |

FOREIGN PATENTS

| Number | Country | Date |
|---|---|---|
| 685,154 | France | Mar. 25, 1930 |